(No Model.)
W. A. ROLLINS.
MEANS FOR TRANSMITTING MOTION.
No. 298,893. Patented May 20, 1884.
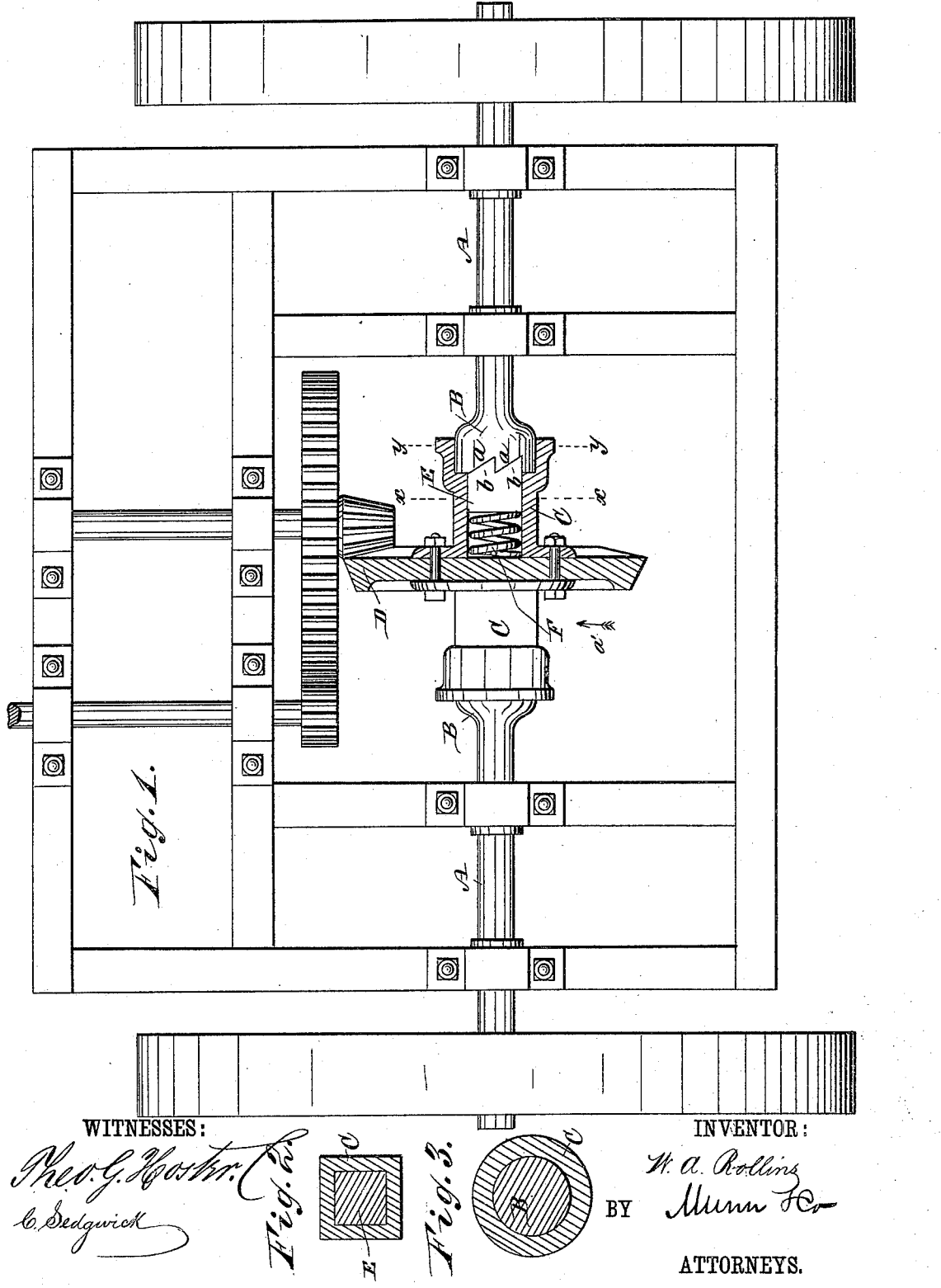

UNITED STATES PATENT OFFICE.

WALTER A. ROLLINS, OF WYATTVILLE, COUNTY OF SURREY, ENGLAND.

MEANS FOR TRANSMITTING MOTION.

SPECIFICATION forming part of Letters Patent No. 298,893, dated May 20, 1884.

Application filed March 7, 1884. (No model.)

*To all whom it may concern:*

Be it known that I, WALTER A. ROLLINS, of Wyattville, Central Hill, Upper Norwood, in the county of Surrey, England, have invented a new and Improved Means for Transmitting Motion, of which the following is a full, clear, and exact description.

The object of my invention is to provide a new and improved device for transmitting motion from one part of machinery to another, in one direction, in such a manner that the parts can revolve independently in the reverse direction.

The invention consists in the combination, with a shaft having teeth formed on its end, of a member held on a piece of machinery to or from which motion is to be transmitted, which member has teeth on its outer end, which toothed end of the member is pressed against the toothed end of the shaft by a suitable spring, all as hereinafter fully described, and pointed out in the claims.

Reference is to be had to the accompanying drawings, forming part of this specification, in which similar letters of reference indicate corresponding parts in all the figures.

Figure 1 is a plan view of a mowing-machine provided with my improvement. Fig. 2 is a cross-sectional elevation on the line $x\,x$, Fig. 1. Fig. 3 is a cross-sectional elevation of the same on the line $y\,y$, Fig. 1.

I have shown my invention as applied on a mowing-machine, but it can also be applied on other machines.

The independent shafts A are each provided on the inner end with an enlargement, B, on the end surface of which ratchet-teeth $a$ are formed. The enlargements project into the tubular ends of squared hollow bosses C, projecting from the opposite sides of a wheel, D, held between the inner ends of the shafts in each of which bosses a block, E, is held in such a manner that it can slide in the boss in the direction of the length of the same, but must turn with the boss. Ratchet-teeth $b$ are formed on the outer end of each block E, and a spiral spring, F, is interposed between the inner end of each block E and the outer surface of the wheel, which springs press the toothed ends of the blocks E against the toothed ends of the enlargements B, thus keeping the blocks engaged with the enlargements. If the machine is moved in the direction of the arrow $a'$, the shafts turn the wheel D; but if the machine is moved in the inverse direction of the arrow $a'$, the teeth of the enlargements will slide over the teeth on the sliding blocks E, and the wheel D will not be revolved. The wheel D is provided with teeth or other means for transmitting motion to other parts of machinery.

Shafts can be coupled in a manner similar to the one described herein.

In applying my improvement on tricycles, the running-wheels are operated from the middle-wheel, but otherwise the arrangement of parts is as herein shown and described.

Having thus described my invention, what I claim as new and desire to secure by Letters Patent, is—

1. In a device for transmitting motion, the combination, with a shaft having ratchet-teeth on its end, of a tubular bar, into which the end of the shaft projects on the other part of the machinery, and a spring-pressed block in said tubular bar, having ratchet-teeth engaging those of the shaft, substantially as herein shown and described.

2. In a device for transmitting motion, the combination, with the shaft A, provided with the enlargement B, having ratchet-teeth $a$, of the wheel D, provided with the hollow boss C, the sliding block E, provided with ratchet-teeth $b$, and the spring F, substantially as herein shown and described.

WALTER A. ROLLINS.

Witnesses:
OLIVER BRYANT,
G. A. BAINBRIDGE,
*Both of Old Swan Wharf, London, E. C.*